United States Patent
Lee et al.

(10) Patent No.: US 9,442,860 B2
(45) Date of Patent: Sep. 13, 2016

(54) PROVIDING RECORD LEVEL SHARING (RLS) TO INDIVIDUAL CATALOGS

(71) Applicant: International Business Machines Corporation, Armonk, NY (US)

(72) Inventors: Jason C. Lee, Union City, CA (US); Terri A. Menendez, Richmond, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/620,124

(22) Filed: Feb. 11, 2015

(65) Prior Publication Data

US 2015/0154117 A1    Jun. 4, 2015

Related U.S. Application Data

(63) Continuation of application No. 13/408,978, filed on Feb. 29, 2012, now Pat. No. 8,996,801.

(51) Int. Cl.
*G06F 12/08* (2016.01)
*G06F 3/06* (2006.01)

(52) U.S. Cl.
CPC .......... *G06F 12/0866* (2013.01); *G06F 3/061* (2013.01); *G06F 3/0638* (2013.01); *G06F 3/0683* (2013.01); *G06F 2212/2146* (2013.01)

(58) Field of Classification Search
CPC .................. G06F 12/0866; G06F 2212/2146; G06F 3/061; G06F 3/0638; G06F 3/0683
See application file for complete search history.

(56) References Cited

U.S. PATENT DOCUMENTS

| | | |
|---|---|---|
| 5,848,241 A | 12/1998 | Misinai et al. |
| 6,002,883 A | 12/1999 | Goldrian |
| 6,675,175 B2 | 1/2004 | Branch et al. |
| 7,260,575 B2 | 8/2007 | Dearing et al. |
| 7,356,493 B2 | 4/2008 | Choi et al. |
| 7,962,615 B1 | 6/2011 | Lehr et al. |
| 8,996,801 B2 | 3/2015 | Lee et al. |
| 2010/0094832 A1 | 4/2010 | Scott et al. |
| 2010/0185589 A1* | 7/2010 | Clarke ................ G06F 11/1469 707/674 |
| 2010/0199058 A1* | 8/2010 | Szowa .............. G06F 17/30067 711/171 |
| 2011/0153817 A1 | 6/2011 | Wright et al. |
| 2013/0227215 A1 | 8/2013 | Lee et al. |

OTHER PUBLICATIONS

Hasegawa, M. "Shared Master Catalogs—Are They Worth Doing?," Mainstar Software Corporation, 2001, pp. 1-3.
IBM, "PeopleSoft V8 on zSeries Using Sysplex Data Sharing and Enterprise Storage Systems," IBM Redbooks, Mar. 2004, pp. 1-134.
(Continued)

*Primary Examiner* — Yong Choe
(74) *Attorney, Agent, or Firm* — Zilka-Kotab, PC

(57) ABSTRACT

In one embodiment, a data storage system includes a server system that includes a processor and a local buffer pool configured to store instances for use in catalog requests, and a direct access storage device (DASD) subsystem electrically coupled to the server system and to at least one DASD, where the at least one DASD includes an integrated catalog facility (ICF) configured to provide at least one catalog, and where the data storage system is configured to provide record level sharing (RLS) for the at least one catalog stored to the at least one DASD.

17 Claims, 5 Drawing Sheets

(56) References Cited

OTHER PUBLICATIONS

IBM Knowledge Center, "Performance aspects of VSAM record-level sharing (RLS)," retrieved from http://publib.boulder.ibm.com/infocenter/cicsts/v3r1/index.jsp?topic=%2Fcom.ibm.cics.ts31.doc%2Fdfht3%2Fdfht3ru.htm, IBM, publication date unknown, 4 pages.

Plow et al., "ICF Catalog Sharing Protocol at Record Key Granularity," IP.com: Prior Art Database, IBM Technical Disclosure Bulletin, vol. 35, No. 4B, Sep. 1992, 1 page.

Rizzuto IT, "Enhanced Catalog Sharing," retrieved from www.rizzuto.it/docs/ecshr.rtf, Aug. 28, 2010, pp. 1-2.

Rizzuto IT, "VSAM RLS Introduction," retrieved from www.rizzuto.it/docs/ecshr.rtf, Aug. 28, 2010, pp. 1-8.

Non-Final Office Action from U.S. Appl. No. 13/408,978, dated Feb. 26, 2014.

Final Office Action from U.S. Appl. No. 13/408,978, dated Sep. 4, 2014.

Notice of Allowance from U.S. Appl. No. 13/408,978, dated Nov. 21, 2014.

Lee et al., U.S. Appl. No. 13/408,978, filed Feb. 29, 2012.

* cited by examiner

PROVIDING RECORD LEVEL SHARING (RLS) TO INDIVIDUAL CATALOGS

BACKGROUND

The present invention relates to proving access to data sets via catalogs, and more particularly, this invention relates to providing record level sharing (RLS) access to the catalogs in an operating system.

Virtual storage access method (VSAM) is a disk file storage access method used in IBM z/OS environments. VSAM data sets include multiple records, and the data sets are of fixed or variable length, and are organized into fixed-size blocks called Control Intervals (CIs). The CIs are then organized into larger groups referred to as Control Areas (CAs). CIs are used as units of transfer between direct access storage devices (DASDs) and requesting systems such that a read request will read one complete CI. CAs are used as units of allocation, such that when a VSAM data set is defined, an integral number of CAs will be allocated for that VSAM data set.

An integrated catalog facility (ICF) is provided on a server or mainframe which includes two components, a basic catalog structure (BCS) and a VSAM volume data set (VVDS). The BCS, sometimes referred to as a catalog generically, is typically structured as a VSAM key sequence data set (KSDS) which is an indexed VSAM organization having the most structured form of a data set, and allows for the VSAM to provide a majority of the access routines without substantial input or direction from the accessing system, besides the most rudimentary information. The BCS component is typically accessed via VSAM non-shared resource (NSR) interfaces, and includes information related to a location of user data sets and system data sets (whichever are stored to the corresponding disk, tape, or optical drive).

The VVDS is typically structured as a VSAM entry sequenced data set (ESDS) which is less structured than the VSAM KSDS. ESDSs do not contain an index component and require access routines to track the location of the records stored in the ESDS. Pointers to VVDS records in the ESDS are stored in the associated BCS records. The VSAM ESDS is accessed via both VSAM NSR and media manager interfaces, and includes information about specific attributes of user data sets and system data sets (whichever are stored to the corresponding DASD). The ICF allows for cross-system sharing of the BCS and VVDS, and is entirely responsible for sharing serialization, caching, and buffer invalidation, among other functions.

As the numbers of user data sets and system data sets grow, so do the catalogs that these data sets use. Every access to a catalog to locate and/or update a record typically uses a global resource serialization (GRS) enqueue (ENQ) request, commonly named SYSIGGV2, to be obtained in one of shared mode or exclusive mode. As a result of using a single request for each catalog access request, sharing a large catalog across multiple systems often encounters large GRS ENQ contentions (or conflicts) over the major name SYSIGGV2 (the minor name is typically the name of the individual catalog being accessed). The enqueue wait time significantly impacts the performance of any large catalogs, particularly during batch windows where batch jobs often require obtaining SYSIGGV2 ENQ in exclusive mode to update records in these catalogs.

In order to try to accommodate for these issues, large catalogs most susceptible to experiencing large wait times have been split into smaller catalogs with different catalog names. In this way, in order to access these small catalogs, different GRS ENQs are acquired, which may reduce each enqueue wait time due to less GRS ENQ contentions. However, splitting large catalogs into smaller catalogs is time consuming and negatively impacts availability. Accordingly, anything that can avoid this disruptive activity while also avoiding the long enqueue wait times for accessing large catalogs would be beneficial.

SUMMARY

In one embodiment, a data storage system includes a server system that includes a processor and a local buffer pool configured to store instances for use in catalog requests, and a direct access storage device (DASD) subsystem electrically coupled to the server system and to at least one DASD, where the at least one DASD includes an integrated catalog facility (ICF) configured to provide at least one catalog, and where the data storage system is configured to provide record level sharing (RLS) for the at least one catalog stored to the at least one DASD.

In another embodiment, a system includes a computer readable storage medium and a processor and logic integrated with and/or executable by the processor. The logic is configured to provide RLS for one or more catalogs. The one or more catalogs are stored on a DASD.

In yet another embodiment, a computer program product includes a computer readable storage medium having computer readable program code embodied therewith. The embodied computer readable program code includes computer readable program code configured to provide RLS for one or more catalogs. The one or more catalogs are stored on a DASD.

According to another embodiment, a method includes providing RLS for one or more catalogs. The one or more catalogs are stored on either a DASD or a tape medium.

Other aspects and embodiments of the present invention will become apparent from the following detailed description, which, when taken in conjunction with the drawings, illustrate by way of example the principles of the invention.

DETAILED DESCRIPTION

Figure 1:
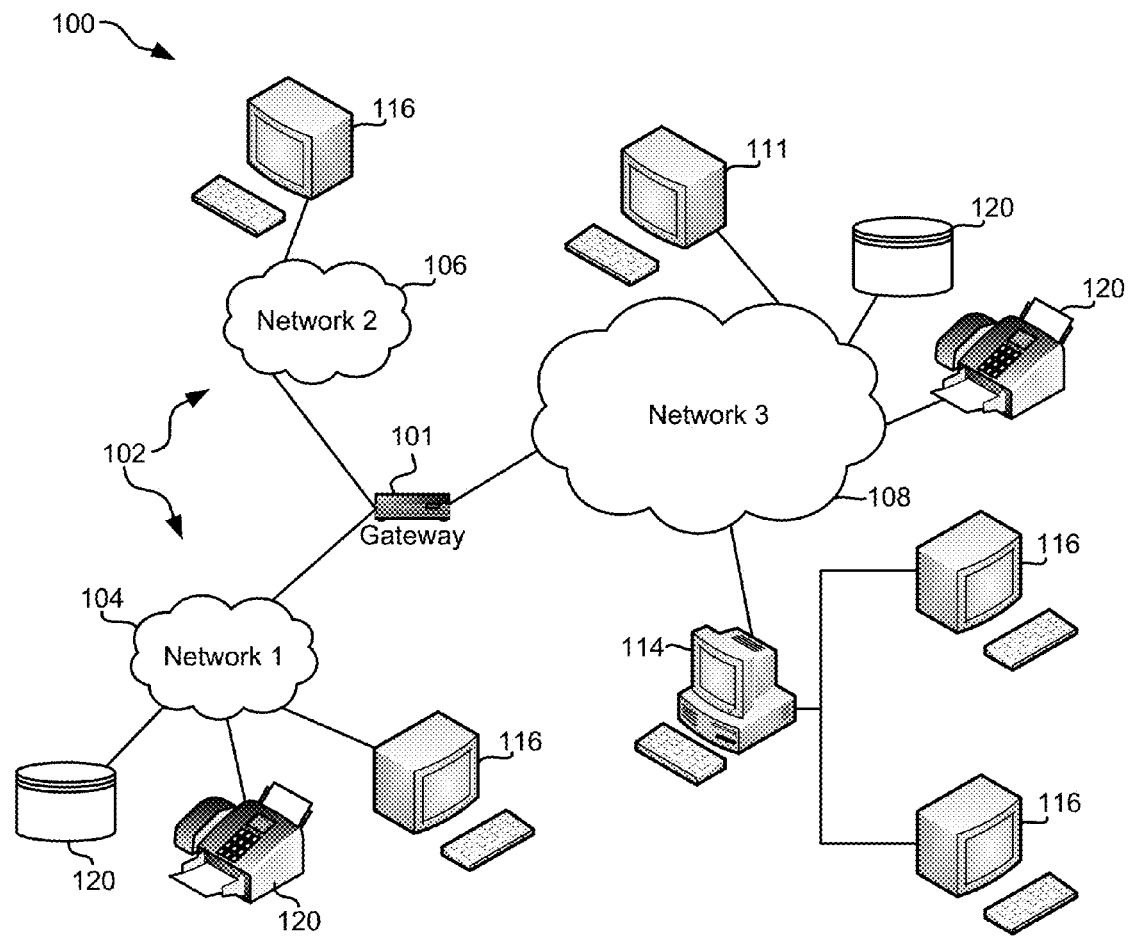
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, virtual storage access method (VSAM) record level sharing (RLS) in IBM z/OS environments may replace currently used basic catalog structure (BCS) sharing and buffering protocols for accessing catalogs with more efficient functionality to avoid issues with BCS. RLS provides full read and write integrity at the record level to any number of users in a parallel sysplex (comprising multiple systems).

In one general embodiment, a data storage system includes a server system having a processor and a local buffer pool for storing instances for use in catalog requests, and a direct access storage device (DASD) subsystem electrically coupled to the server system and to at least one DASD, wherein the at least one DASD includes an integrated catalog facility (ICF) adapted for providing at least one catalog configured according to a BCS and a VSAM volume data set (VVDS), wherein the at least one catalog includes at least one of: a user catalog including information related to locations of user data sets and system data sets stored to the at least one DASD, and a tape volume catalog including information related to locations of user data sets and system data sets stored to at least one tape medium, and wherein the data storage system is adapted for providing RLS for the at least one catalog stored to the at least one DASD.

In another general embodiment, a system includes a computer readable storage medium, logic adapted for receiving a request to open a VSAM catalog, wherein the catalog is stored on a DASD and includes at least one of: a user catalog including information related to locations of data sets stored to the DASD and a tape volume catalog including information related to locations of user data sets and system data sets stored to a tape medium, logic adapted for receiving an indication of at least one record in the catalog, wherein the at least one record in the catalog corresponds to at least one data set stored to either the DASD or the tape medium, logic adapted for causing the at least one record in the catalog to be locked, logic adapted for storing an instance of a portion of the catalog including the at least one record to the computer readable storage medium, logic adapted for modifying the instance of the portion of the catalog according to modifications to the at least one data set stored to either the DASD or the tape medium, and logic adapted for storing the instance of the portion of the catalog back down to the catalog in the DASD.

In yet another general embodiment, a computer program product includes a computer readable storage medium having computer readable program code embodied therewith, the computer readable program code including computer readable program code configured to receive a request to open a file directory, wherein the file directory is stored on a DASD and includes at least one of: a directory including information related to locations of files stored to the DASD and a tape volume directory including information related to locations of files stored to a tape medium, computer readable program code configured to receive a key associated with a record in the file directory, wherein the record in the file directory corresponds to at least one file stored to either the DASD or the tape medium, and computer readable program code configured to cause the record in the file directory to be locked.

According to another general embodiment, a method includes receiving a first request to open a VSAM catalog, wherein the catalog includes at least one of: a user catalog including information related to locations of data sets stored to a DASD and a tape volume catalog including information related to locations of user data sets and system data sets stored to a tape medium, receiving indication of a first record in the catalog, wherein the first record in the catalog corresponds to at least one first data set stored to either the DASD or the tape medium, causing the first record in the catalog to be locked, receiving a second request to open the catalog, receiving indication of a second record in the catalog, wherein the second record in the catalog corresponds to at least one second data set stored to either the DASD or the tape medium, and causing the second record in the catalog to be locked contemporaneous with the first record in the catalog being locked.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
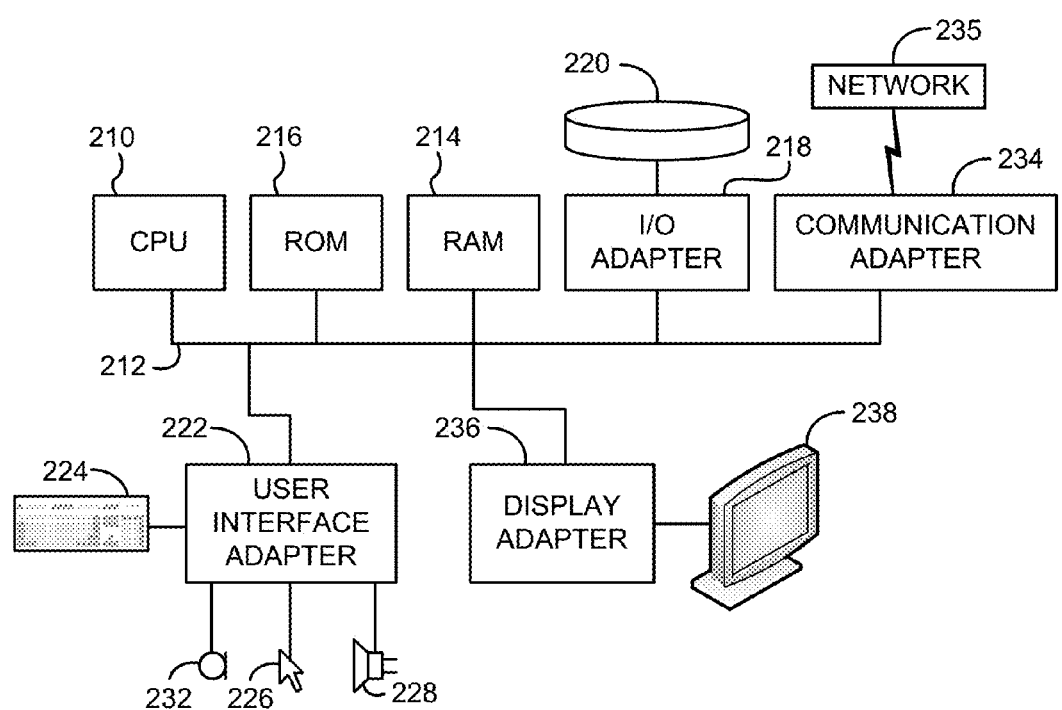
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit 210, such as a microprocessor, and a number of other units interconnected via a system bus 212, according to one embodiment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
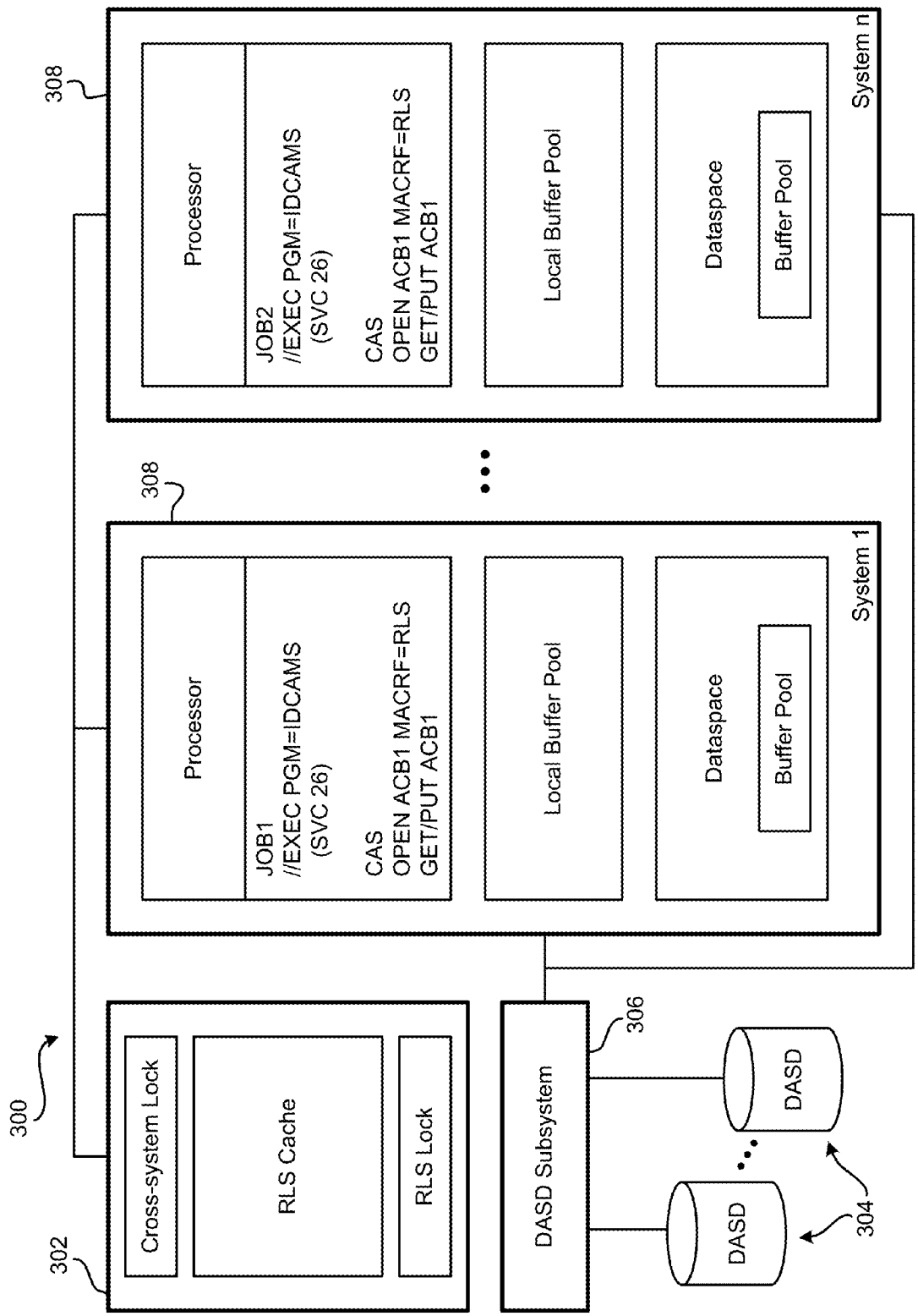
FIG. 3 is a simplified block diagram of a data storage system, according to one embodiment.

Referring now to FIG. 3, a block diagram of a data storage system 300 is shown according to one embodiment. As shown, the data storage system 300 comprises at least one server system 308, at least one coupling facility 302 electrically coupled to the at least one server system 308, and a direct access storage device (DASD) subsystem 306 electrically coupled to the at least one server system 308 and to at least one DASD 304.

The at least one coupling facility 302 may comprise an RLS cache, a RLS lock, and a default lock (such as IGW-LOCK00 in z/OS). Both the RLS lock and the default lock are global locking mechanisms capable of locking records across multiple systems. The default lock is a master lock that allows for cross-system locking of individual records of a catalog and/or dataset (any VSAM dataset including catalogs) along with other types of locks. The RLS lock is an optional mechanism that may be used for cross-system locking individual records of a catalog and/or dataset (any VSAM dataset including catalogs) similar to the default lock, and may be further used for compartmentalizing or otherwise segregating records being locked according to their respective dataset (e.g., any records from a first dataset or catalog may be locked using RLS lock, while any records from a second dataset or catalog may be locked using the default lock), such that portions of the dataset or catalog are not accessed by multiple entities at the same time. The RLS cache comprises memory for the storage of catalog data and is used by VSAM for registering the catalog data for purposes of invalidation across all catalog storage pools.

Each server system 308 may comprise a processor for executing computer readable program code (an example of which is provided in FIG. 3), and a local buffer pool adapted for storing instances of data for use in catalog requests. The local buffer pool may be an SMSVSAM buffer pool in z/OS, and may comprise 64 bits, according to one embodiment. Also, the at least one DASD 304 comprises an integrated catalog facility (ICF) adapted for providing at least one catalog configured according to a basic catalog structure (BCS) and a virtual storage access method (VSAM) volume data set (VVDS). The at least one catalog for the at least one DASD 304 comprises information related to locations of user and/or system data sets (data sets) stored to the at least one DASD 304. In addition, the data storage system 300 is adapted for providing RLS for the at least one catalog stored to the at least one DASD 304.

Each server system 308 may also comprise a dataspace for storing and modifying data, which may have its own buffer pool, as shown in FIG. 3. This buffer pool may be a 31 bit buffer pool, according to one embodiment. The dataspace may be associated with the SMSVSAM address space in z/OS, according to one embodiment.

Any of the server systems 308 (System 1 . . . System n) may be a mainframe (such as an IBM z-series mainframe), a server (such as an IBM BLADE server), a storage server, a host, or any other suitable computing device known in the art. Furthermore, the processor of each server system 308 may comprise one or more suitable processors, such as a central processing unit (CPU), a field programmable gate array (FPGA), a microprocessor, an integrated circuit (IC), an application specific integrated circuit (ASIC), etc.

According to one embodiment, the coupling facility 302 may include a RLS cache adapted for storing instances for use in catalog requests and a RLS lock adapted for causing one or more records to be locked within the at least one catalog without locking all records within the at least one catalog during catalog requests.

In more embodiments, the server system may be further adapted for receiving multiple catalog requests contemporaneously and providing access to different portions of the at least one catalog in response to the multiple catalog requests. This may be achievable by locking the catalog on a record level, rather than locking the entire catalog, as is in conventional systems.

In a more generally applicable embodiment, a system may comprise a computer readable storage medium (such as a RLS cache, buffer pool, etc.), logic adapted for receiving a request to open a VSAM catalog, with the catalog being stored (at least initially) on a DASD, logic adapted for receiving an indication (such as a key) of at least one record in the catalog with the at least one record in the catalog corresponding to at least one data set stored to the DASD, logic adapted for causing the at least one record in the catalog to be locked (but not other portions of the catalog), logic adapted for storing an instance of a portion of the catalog comprising the at least one record to the computer readable storage medium (such that it may be read, modified, etc.), logic adapted for modifying the instance of the portion of the catalog according to modifications to the at least one data set stored to the DASD (in this way, any changes to the actual data sets corresponding to the records in the catalog are reflected in the records in the instance of the portion of the catalog), and logic adapted for storing the instance of the portion of the catalog back down to the catalog in the DASD (thereby overwriting the old version of the catalog with the modified catalog portion).

In a further embodiment, the system may comprise logic adapted for receiving a second request to open the catalog (received either contemporaneous with or after the initial request), logic adapted for receiving an indication of at least one second record in the catalog with the at least one second record in the catalog corresponding to at least one second data set stored to the DASD (this way the records in the catalog are not the same records, which would cause a failure), logic adapted for causing the at least one second record in the catalog to be locked contemporaneous to the at least one first record in the catalog being locked (so that two or more portions of the catalog may be locked at the same time, by the same or different systems), logic adapted for storing an instance of a second portion of the catalog comprising the at least one second record to the non-transitory computer readable storage medium, logic adapted for modifying the instance of the second portion of the catalog according to modifications to the at least one second data set stored to the DASD, and logic adapted for storing the instance of the second portion of the catalog back down to the catalog in the DASD (in this way, changes that were made to the first portion are not overwritten by changes made to the second portion, and vice versa, thereby allowing parallel processing of multiple catalog requests).

Conventional (base) VSAM provides three types of buffering, non-shared resources (NSR), local shared resources (LSR), and global shared resources (GSR). An Access Method Services utility program IDCAMS is commonly used to manipulate VSAM data sets, including deleting data sets and defining new data sets. Base VSAM serializes on a control interval (CI) level at each DASD 304.

In one approach, VSAM may be expanded to include another type of buffering: RLS. In this way, RLS in IBM z/OS environments may replace currently used BCS sharing and buffering protocols for accessing catalogs with more efficient functionality to avoid the issues with the BCS. RLS provides record level locking and local/global buffer pools, according to some embodiments. In one embodiment, the local/global buffer pools may be 64 bit buffer pools.

According to one embodiment, new parameters may be defined in the Access Method Services utility program IDCAMS for VSAM. The new parameters may be included for DEFINE USERCATALOG, DELETE USERCATALOG, and ALTER USERCATALOG, which are provided to allow individual catalogs to be eligible for RLS access and for manipulation of individual catalogs. The new parameters are also provided to indicate an initial type of access to be used (e.g., NSR or RLS) on the first reference of the catalog.

The new DEFINE USERCATALOG parameters include the following parameters:

LOG parameter provides the level of recovery that RLS is able to provide for the data set or catalog and is eligible for RLS access. In this enhancement, according to one embodiment, only non-recoverable catalogs, i.e., LOG (NONE), may be supported.

RLSQUIESCE parameter indicates that the catalog is to be accessed by non-RLS (NSR) on first access following DEFINE.

RLSENABLE parameter indicates that the catalog is to be accessed with RLS on first reference following DEFINE.

SUSPEND parameter indicates all unauthorized catalog requests will be suspended following the DEFINE. Unauthorized users, according to one embodiment, include any user whose ID is not permitted to the resource access control facility (RACF) class IGG.CATLOCK with read access.

RESUME parameter indicates that all catalog requests will be resumed following the DEFINE.

RECONNECT parameter reuses the existing UCONN record (alias information).

LOCK parameter indicates that all unauthorized requests will be failed following the DEFINE.

UNLOCK parameter indicates that all requests will be allowed following the DEFINE.

STORCLAS parameter specifies a RLS capable storage class (CACHESET/LOCKSET).

The new parameter for DELETE USERCATALOG includes NODISCONNECT which does not delete the UCONN record (alias information). However, catalogs accessed by RLS at the time of the delete will be closed sysplex wide prior to the delete.

The new parameters for ALTER USERCATALOG, according to one embodiment, include LOG, RLSQUIESCE/RLSENABLE, SUSPEND/RESUME, LOCK/UNLOCK, as described above for DEFINE USERCATALOG which act on a sysplex wide basis, and NULLIFY(LOG). NULLIFY removes the LOG attribute and rests RLS related flags. The catalog is no longer eligible for RLS access, and must be closed at the time of the ALTER.

In addition, in some embodiments, new z/OS MODIFY (F) operator commands may be provided to dynamically enable or quiesce open catalogs for RLS. These commands may include:

F CATALOG,RLSENABLE(ucat*)—this enables RLS for all user catalogs

F CATALOG,RLSQUIESCE(ucat*)—this disables RLS for all user catalogs

F CATALOG,RLSENABLE,SYSTEM—this enables RLS for all system catalogs

F CATALOG,RLSQUIESCE,SYSTEM—this disables RLS for all system catalogs

The commands may be issued from one system (or image) in a sysplex (comprising multiple systems), and results in sysplex wide enable or quiesce of the specified catalogs, e.g., all system catalogs (SYSTEM) or user catalogs (ucat*). In one approach to avoid contentions and damage to catalogs, catalog requests are suspended when enabling/quiescing RLS access. Furthermore, no catalog requests fail as a result of the enable or quiesce, according to the embodiment described herein.

In more approaches, the existing z/OS MODIFY (F) operator command, F CATALOG,ALLOCATED, may be modified to include RLS related information. In this situation, U may be used to indicate that RLS is enabled (e.g., F CATALOG,RLSENABLE was issued for this catalog).

In order to protect the integrity of catalogs accessed by RLS, the SYSIGGV2 ucatname resource may be raised as a SYSTEMS level shared enqueue, by each SMSVSAM address space for each catalog opened for RLS, in some embodiments. Also, in some approaches, SYSIGGV2 ucatname may be dequeued when the catalog is closed for RLS access.

Figure 4:
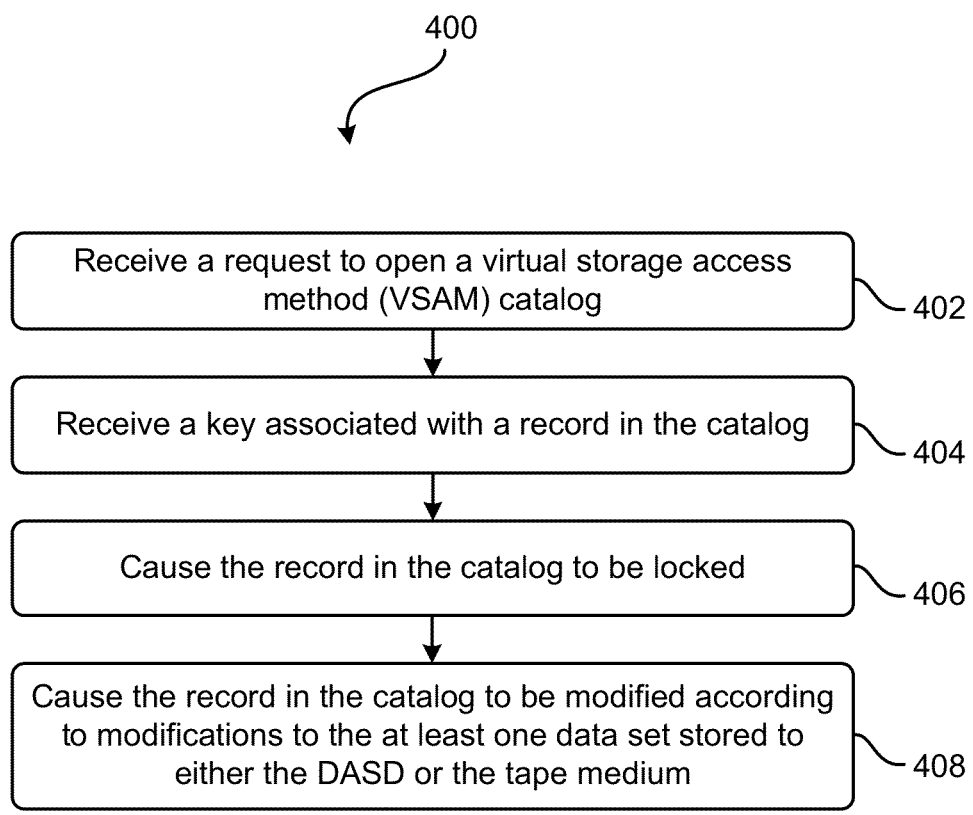
FIG. 4 is a flowchart of a method, according to one embodiment.

Now referring to FIG. 4, a flowchart of a method 400 is shown, according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in one embodiment, the method 400 may be partially or entirely performed by a mainframe in an IBM z/OS environment, in one approach, a DASD subsystem, in another approach, or a coupling facility, in yet another approach, as described herein in more detail.

Optional operations described below are those operations which may be omitted, may be performed once while other operations are performed multiple times or vice versa, may be performed by other entities or systems and relied upon by other operations, etc., according to various embodiments.

As shown in FIG. 4, method 400 may initiate with operation 402, where a request to open a VSAM catalog is received. The catalog is stored on a DASD or some other readily accessed storage device and comprises at least one of: a user catalog comprising information related to locations of data sets stored to the DASD, and a tape volume catalog comprising information related to locations of data sets stored to a tape medium. Because data sets are stored to tape medium sequentially, it typically takes longer to access data sets on tape medium, and therefore it is not a preferred storage medium for the catalog. However, in some approaches, a catalog may be stored to the tape medium, or possibly to a direct access cache of the tape cartridge, such as Flash memory, RAM, etc.

In one approach, the data sets stored to either the DASD or the tape medium may comprise at least one user data set and/or system data set. Of course, multiple data sets, both user and system, may be stored to any storage medium.

In operation 404, a key associated with a record in the catalog is received. The record in the catalog corresponds to at least one data set stored to either the DASD or the tape medium. Since the catalog is a collection of information about locations of data sets, each record in the catalog corresponds to a data set stored to some storage medium. Therefore, in one approach, in order to access the appropriate record in the catalog, a key for the record is provided to identify the appropriate record in the catalog.

In one approach, the key may be a name of the record in the catalog, which may be an alphanumeric code in a further approach.

Of course, in other embodiments, some identification other than a key may be used, such as having a pointer that directs to the record, a hyperlink, etc., a location of the record in the catalog, surrounding entries to the desired record, etc., as known in the art.

In operation 406, the record in the catalog is caused to be locked. If the catalog is stored to a local device, then the record may be locked by the system executing method 400. Otherwise, the system executing method 400 may request that the record be locked or intercept requests to access the record and hold them or deny them such that the record in the catalog is not altered or accessed. Of course, other ways of locking the record may be used as known in the art.

In optional operation 408, the record in the catalog is caused to be modified according to modifications to the at least one data set stored to either the DASD or the tape medium. In this way, any changes to the underlying data set which the record corresponds to are reflected in the record, thereby ensuring that the record is an accurate reflection of the corresponding data set stored to the storage medium.

In some more specific embodiments, operation 408 may include storing an instance of a CI comprising the record of the catalog to a non-transitory computer readable memory and modifying the instance of the CI according to modifications to the at least one data set stored to either the DASD or the tape medium. In addition, in some approaches, the non-transitory computer readable memory may be a shared RLS cache of a coupling facility, a buffer pool of a server system, or any other suitable storage medium as known in the art.

In a further embodiment, operation 408 may also include writing the modified instance of the CI to the catalog stored to the DASD, thereby updating the record in the catalog with the most up-to-date information about the data set stored to the storage medium.

Overall, method 400 is intended to provide RLS for the catalog stored to the DASD. In this way, the catalog may be accessed by multiple requests and/or multiple systems contemporaneously and/or simultaneously, without causing contentions and/or fails to the requests, resulting in more efficient catalog operation.

Figure 5:
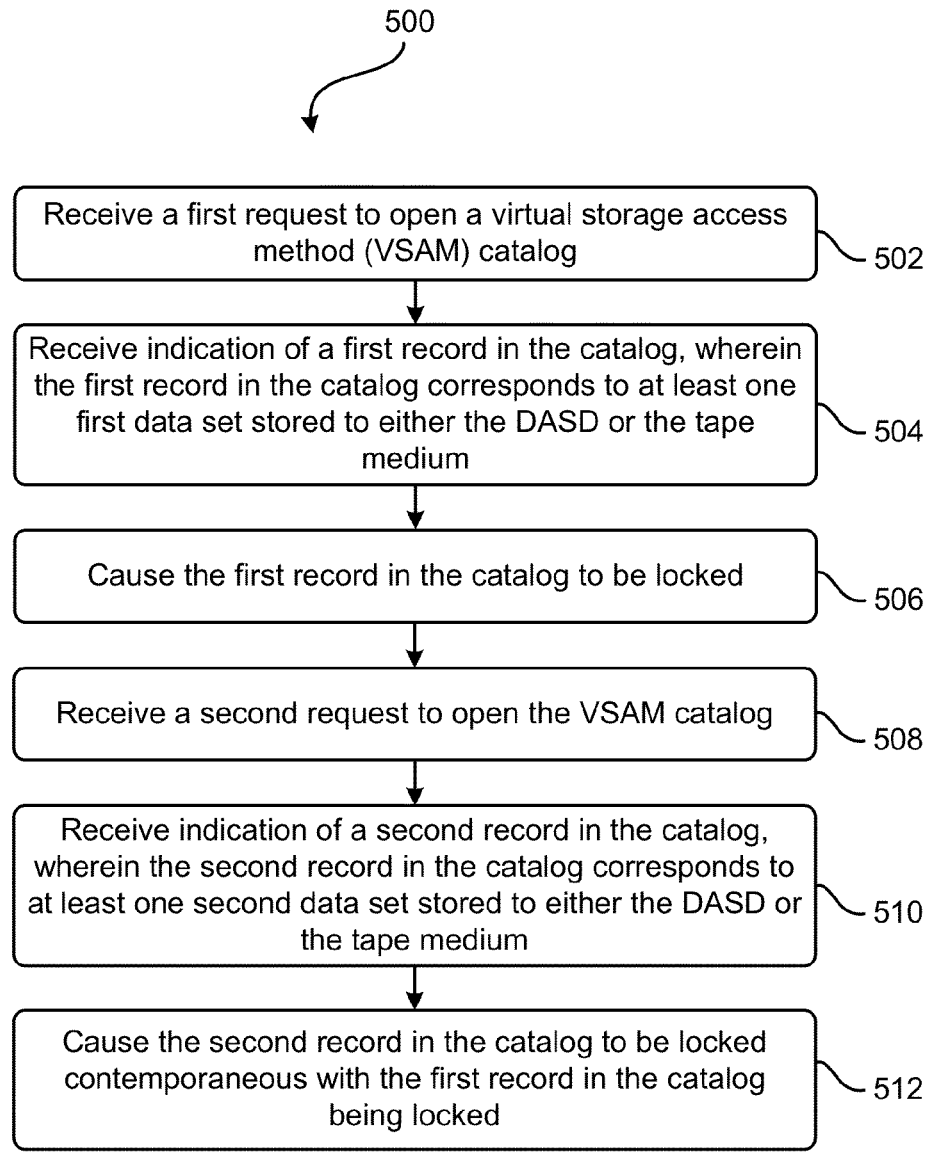
FIG. 5 is a flowchart of a method, according to one embodiment.

Now referring to FIG. 5, a flowchart of a method 500 is shown, according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a mainframe in an IBM z/OS environment, in one approach, a DASD subsystem, in another approach, or a coupling facility, in yet another approach, as described herein in more detail.

Optional operations described below are those operations which may be omitted, may be performed once while other operations are performed multiple times or vice versa, may be performed by other entities or systems and relied upon by other operations, etc., according to various embodiments.

As shown in FIG. 5, method 500 may initiate with operation 502, where a first request to open a VSAM catalog is received. The catalog comprises at least one of: a user catalog comprising information related to locations of data sets stored to a DASD, and a tape volume catalog comprising information related to locations of user data sets and system data sets stored to a tape medium.

In operation 504, indication of a first record in the catalog is received thereby allowing the first record to be accessed in the catalog (first record is not necessarily indicating the first record sequentially, but just that it is a first record different from the second record described later in method 500). The first record in the catalog corresponds to at least one first data set stored to either the DASD or the tape medium.

In operation 506, the first record in the catalog is caused to be locked. If the catalog is stored to a local device, then the first record may be locked by the system executing method 500. Otherwise, the system executing method 500 may request that the first record be locked or intercept requests to access the first record and hold them or deny them such that the first record in the catalog is not altered or accessed. Of course, other ways of locking the first record may be used as known in the art.

In operation 508, a second request to open the catalog is received. The second request may originate from the same system which sent the first request, or may originate from a different system.

In operation 510, indication of a second record in the catalog is received thereby allowing the second record to be accessed in the catalog (second record is not necessarily indicating the second record sequentially, but just that it is a second record different from the first record described earlier in method 500). The second record in the catalog corresponds to at least one second data set stored to either the DASD or the tape medium, or to other DASDs or other tape media.

In operation 512, the second record in the catalog is caused to be locked contemporaneous with the first record in the catalog being locked. This means that separate records (the first and second record) in the catalog may be locked separately at the same time, and that records in the catalog that are not locked are still accessible. Furthermore, the catalog is capable of allowing records to be locked by multiple systems and/or requests. If the catalog is stored to a local device, then the second record may be locked by the system executing method 500. Otherwise, the system executing method 500 may request that the second record be locked or intercept requests to access the second record and hold them or deny them such that the second record in the catalog is not altered or accessed. Of course, other ways of locking the second record may be used as known in the art.

In some further embodiments, the method 500 may include causing the first record in the catalog to be modified according to modifications to the at least one first data set stored to either the DASD or the tape medium, and/or causing the second record in the catalog to be modified according to modifications to the at least one second data set stored to either the DASD or the tape medium.

In additional approaches, causing the first record in the catalog to be modified may comprise storing an instance of a first CI comprising the first record in the catalog to a non-transitory computer readable memory and modifying the instance of the first CI according to modifications to the at least one first data set stored to either the DASD or the tape medium. Furthermore, causing the second record in the catalog to be modified may comprise storing an instance of a second CI comprising the second record in the catalog to the non-transitory computer readable memory and modifying the instance of the second CI according to modifications to the at least one second data set stored to either the DASD or the tape medium. Of course, other data groupings may be used in place of or in addition to CIs, such as CAs, tracks, records, etc.

Method 500 is intended to provide RLS for the catalog stored to the DASD, according to multiple preferred embodiments.

According to the embodiments and/or approaches described herein, performance is expected to improve by eliminating contention on current catalog serialization (e.g., the SYSIGGV2 resource), reducing I/O activity (via larger local/global buffering), and improving cross system buffer invalidation (via XES/XCF cross invalidation). Usability and availability are also expected to improve since there is no longer a need to split catalogs in order to reduce contention and improve performance in most embodiments. Catalog size should no longer be a factor in maintaining and managing user catalogs, in further approaches.

A computer program product comprising a computer readable storage medium having computer readable program code embodied therewith, may be provided for executing method 500, in accordance with a further embodiment. The computer readable program code may comprise computer readable program code configured to receive a request to open a file directory. The file directory (similar to a catalog) is stored on a DASD and comprises at least one of: a directory comprising information related to locations of files stored to the DASD, and a tape volume directory comprising information related to locations of files stored to a tape medium. The files are similar to data sets in z/OS. The computer program product may further comprise computer readable program code configured to receive a key associated with a record in the file directory, wherein the record in the file directory corresponds to at least one file stored to either the DASD or the tape medium, and computer readable program code configured to cause the record in the file directory to be locked.

Furthermore, in some approaches, the files stored to either the DASD or the tape medium may comprise at least one user file and/or system file, the key may be a name of the file, and/or the computer program product may further comprise computer readable program code configured to cause the record in the file directory to be modified according to modifications to the at least one file stored to either the DASD or the tape medium.

In a further embodiment, the computer readable program code configured to cause the record in the file directory to be modified may comprise computer readable program code configured to store an instance of a portion of the file directory comprising the record to a non-transitory computer readable memory, and computer readable program code configured to modify the instance of the portion of the file directory according to modifications to the at least one file stored to either the DASD or the tape medium.

In further embodiments, the non-transitory computer readable memory may be at least one of: a shared RLS cache of a coupling facility and a buffer pool of a server system and/or the computer readable program code may comprise computer readable program code configured to write the modified instance of the portion of the file directory to the file directory stored to the DASD.

In another approach, the computer readable program code may comprise computer readable program code configured to provide RLS for the file directory stored to the DASD.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A data storage system, comprising:
   a server system comprising a processor and a local buffer pool configured to store instances for use in catalog requests; and
   a direct access storage device (DASD) subsystem electrically coupled to the server system and to at least one DASD,
   wherein the at least one DASD comprises an integrated catalog facility (ICF) configured to provide at least one catalog, and
   wherein the data storage system is configured to provide record level sharing (RLS) for the at least one catalog stored to the at least one DASD.

2. The system as recited in claim 1, further comprising a coupling facility electrically coupled to the server system, wherein the coupling facility comprises:
   a RLS cache configured to store instances for use in catalog requests; and
   a RLS lock configured to cause one or more records to be locked within the at least one catalog without locking all records within the at least one catalog during catalog requests.

3. The system as recited in claim 1, wherein the server system is further configured to receive multiple catalog requests contemporaneously and provide access to different portions of the at least one catalog in response to the multiple catalog requests.

4. A system, comprising:
   a computer readable storage medium;
   a direct access storage device (DASD); and
   a processor and logic integrated with and/or executable by the processor, the logic being configured to:
      provide record level sharing (RLS) for one or more catalogs, the one or more catalogs being stored on the DASD, wherein the DASD comprises an integrated catalog facility (ICF) configured to provide at least one catalog;
      receive a request to open the catalog, wherein the catalog is stored on the DASD;
      receive an indication of at least one record in the catalog, wherein the at least one record in the catalog corresponds to at least one data set stored to the DASD;
      cause the at least one record in the catalog to be locked; and
      store an instance of a portion of the catalog comprising the at least one record to the computer readable storage medium.

5. The system as recited in claim 4, wherein the logic is further configured to:
   modify the instance of the portion of the catalog according to modifications to the at least one data set stored to the DASD; and
   store the instance of the portion of the catalog back down to the catalog in the DASD.

6. The system as recited in claim 4, wherein the logic is further configured to:
   receive a second request to open the catalog;

receive an indication of at least one second record in the catalog, wherein the at least one second record in the catalog corresponds to at least one second data set stored to the DASD;

cause the at least one second record in the catalog to be locked contemporaneous to the at least one record in the catalog being locked;

store an instance of a second portion of the catalog comprising the at least one second record to the computer readable storage medium;

modify the instance of the second portion of the catalog according to modifications to the at least one second data set stored to the DASD; and store the instance of the second portion of the catalog back down to the catalog in the DASD.

7. A computer program product, the computer program product comprising a computer readable hardware storage device having computer readable program code embodied therewith, the embodied computer readable program code comprising:

computer readable program code configured to provide record level sharing (RLS) for one or more catalogs, the one or more catalogs being stored on a direct access storage device (DASD);

computer readable program code configured to receive a request to open a file directory, wherein the file directory is stored on the DASD and comprises a directory comprising information related to locations of files stored to the DASD;

computer readable program code configured to receive a key associated with a record in the file directory, wherein the record in the file directory corresponds to at least one file stored to the DASD; and computer readable program code configured to cause the record in the file directory to be locked.

8. The computer program product as recited in claim 7, wherein the files stored to the DASD comprise at least one user file and/or system file.

9. The computer program product as recited in claim 7, wherein the key is a name of the file.

10. The computer program product as recited in claim 7, wherein the embodied computer readable program code further comprises computer readable program code configured to cause the record in the file directory to be modified according to modifications to the at least one file stored to the DASD.

11. The computer program product as recited in claim 10, wherein the computer readable program code configured to cause the record in the file directory to be modified comprises:

computer readable program code configured to store an instance of a portion of the file directory comprising the record to a computer readable memory; and computer readable program code configured to modify the instance of the portion of the file directory according to modifications to the at least one file stored to the DASD.

12. The computer program product as recited in claim 11, wherein the computer readable memory is at least one of: a shared record level sharing (RLS) cache of a coupling facility and a buffer pool of a server system.

13. The computer program product as recited in claim 11, wherein the embodied computer readable program code further comprises computer readable program code configured to write the modified instance of the portion of the file directory to the file directory stored to the DASD.

14. A method, comprising:

providing record level sharing (RLS) for one or more catalogs, the one or more catalogs being stored on either a direct access storage device (DASD) or a tape medium;

receiving a first request to open a catalog, wherein the catalog comprises at least one of: a user catalog comprising information related to locations of data sets stored to the DASD, and a tape volume catalog comprising information related to locations of user data sets and system data sets stored to the tape medium;

receiving indication of a first record in the catalog, wherein the first record in the catalog corresponds to at least one first data set stored to either the DASD or the tape medium; and causing the first record in the catalog to be locked.

15. The method as recited in claim 14, further comprising:

receiving a second request to open the catalog;

receiving indication of a second record in the catalog, wherein the second record in the catalog corresponds to at least one second data set stored to either the DASD or the tape medium; and causing the second record in the catalog to be locked contemporaneous with the first record in the catalog being locked.

16. The method as recited in claim 15, further comprising:

causing the first record in the catalog to be modified according to modifications to the at least one first data set stored to either the DASD or the tape medium; and causing the second record in the catalog to be modified according to modifications to the at least one second data set stored to either the DASD or the tape medium.

17. The method as recited in claim 14, wherein the causing the first record in the catalog to be modified comprises:

storing an instance of a first control interval (CI) comprising the first record in the catalog to a computer readable memory; and modifying the instance of the first CI according to modifications to the at least one first data set stored to either the DASD or the tape medium, wherein the computer readable memory is at least one of: a shared RLS cache of a coupling facility and a buffer pool of a server system.

* * * * *